US011121482B2

(12) United States Patent
Sirola et al.

(10) Patent No.: US 11,121,482 B2
(45) Date of Patent: Sep. 14, 2021

(54) ELECTRICALLY-CONDUCTIVE CORROSION-PROTECTIVE COVERING

(71) Applicant: SHORE ACRES ENTERPRISES INC., Barrie (CA)

(72) Inventors: Brien Todd Sirola, Barrie (CA); Christopher Paul Berni, Barrie (CA); Donald Brien Sirola, Barrie (CA); Caitlin Emma Morrissey Hughes, Barrie (CA)

(73) Assignee: SHORE ACRES ENTERPRISES INC., Barrie (CA)

( * ) Notice: Subject to any disclaimer, the term of this patent is extended or adjusted under 35 U.S.C. 154(b) by 311 days.

(21) Appl. No.: 16/147,965

(22) Filed: Oct. 1, 2018

(65) Prior Publication Data

US 2019/0103684 A1  Apr. 4, 2019

Related U.S. Application Data

(60) Provisional application No. 62/703,481, filed on Jul. 26, 2018, provisional application No. 62/568,015, filed on Oct. 4, 2017.

(51) Int. Cl.
*H01R 4/66* (2006.01)
*H01R 43/00* (2006.01)
(Continued)

(52) U.S. Cl.
CPC ............... *H01R 4/66* (2013.01); *C09D 5/08* (2013.01); *C09D 5/084* (2013.01); *C09D 5/24* (2013.01);
(Continued)

(58) Field of Classification Search
CPC .......... H01R 4/66; H01R 13/03; H01R 43/00; C09D 5/08; C09D 5/084; C09D 5/24;
(Continued)

(56) References Cited

U.S. PATENT DOCUMENTS

| 1,661,712 A | 3/1928 | Wagner |
| 2,196,172 A | 4/1940 | Billings et al. |

(Continued)

FOREIGN PATENT DOCUMENTS

| EP | 0100170 B1 | 10/1986 |
| GB | 1424162 A | 2/1976 |

(Continued)

OTHER PUBLICATIONS

Electrically Conductive Adhesives—Henkel, https://www.henkel-adhesives.com/us/en/products/industrial-adhesives/electrically-conductive-adhesives.html.

*Primary Examiner* — Angel R Estrada
(74) *Attorney, Agent, or Firm* — ABM Intellectual Property Inc.; Adrienne Bieber McNeil

(57) ABSTRACT

A corrosion-protected electrical assembly includes a metallic component (e.g. a utility pole or a guy anchor rod or direct buried tower steel) having an outer surface, and a water-impermeable, electrically-conductive, covering applied to at least a portion of the outer surface. A covering for a metallic component includes a water-impermeable polymeric matrix, and a particulate carbonaceous material dispersed in the polymeric matrix. A method for protecting a metallic component from corrosion includes applying a covering to an outer surface of the metallic component at the bottom portion of the metallic component. The covering is water-impermeable and electrically-conductive.

3 Claims, 3 Drawing Sheets

(51) Int. Cl.
*C09D 5/08* (2006.01)
*C09D 5/24* (2006.01)
*H01B 1/24* (2006.01)
*H01R 13/03* (2006.01)
*B82Y 30/00* (2011.01)

(52) U.S. Cl.
CPC ............... *H01B 1/24* (2013.01); *H01R 13/03* (2013.01); *H01R 43/00* (2013.01); *B82Y 30/00* (2013.01)

(58) Field of Classification Search
CPC .......... B82Y 30/00; C23F 13/00; C23F 13/02; C23F 13/005; H02G 13/00; C04B 14/022; C04B 14/024
USPC ...... 174/60, 5 R, 2, 3, 5 SG, 59, 135, 126.4, 174/68.1, 126.1, 137 A; 29/592.1, 592
See application file for complete search history.

(56) References Cited

U.S. PATENT DOCUMENTS

| | | | |
|---|---|---|---|
| 2,495,466 A | 1/1950 | Miller | |
| 2,553,654 A | 5/1951 | Heise | |
| 3,072,558 A | 1/1963 | Myers et al. | |
| 3,334,040 A | 8/1967 | Conrad et al. | |
| 3,573,427 A | 4/1971 | Minsk | |
| 3,616,354 A | 10/1971 | Russell | |
| 3,716,649 A | 2/1973 | Walker et al. | |
| 3,725,669 A | 4/1973 | Tatum | |
| 3,725,699 A | 4/1973 | Pascoe | |
| 3,876,819 A * | 4/1975 | Boyd | H02G 13/40 174/7 |
| 3,917,781 A | 11/1975 | Gabriel et al. | |
| 3,927,163 A | 12/1975 | Gabriel et al. | |
| 3,941,918 A | 3/1976 | Nigol et al. | |
| 3,962,142 A | 6/1976 | Freeman et al. | |
| 4,017,569 A | 4/1977 | Hass | |
| 4,018,715 A | 4/1977 | Tatum | |
| 4,144,077 A | 3/1979 | Gallus | |
| 4,170,532 A | 10/1979 | Tatum | |
| 4,175,021 A | 11/1979 | Tatum et al. | |
| 4,192,963 A | 3/1980 | Koehmstedt | |
| 4,400,259 A | 8/1983 | Schutt | |
| 4,407,676 A | 10/1983 | Restrepo | |
| 4,414,030 A | 11/1983 | Restrepo | |
| 4,442,903 A | 4/1984 | Schutt et al. | |
| 4,472,468 A | 9/1984 | Tailor et al. | |
| 4,544,464 A | 10/1985 | Bianchi et al. | |
| 4,710,644 A | 12/1987 | Baach | |
| 4,786,388 A | 11/1988 | Tatum, Jr. | |
| 4,799,959 A | 1/1989 | Fourez et al. | |
| 4,871,395 A | 10/1989 | Sugama | |
| 4,908,157 A | 3/1990 | Fontana et al. | |
| 5,026,468 A | 6/1991 | Carpenter et al. | |
| 5,026,508 A | 6/1991 | Tatum, Jr. et al. | |
| 5,040,599 A | 8/1991 | Pfalser et al. | |
| 5,055,166 A | 10/1991 | Schutt | |
| 5,070,597 A * | 12/1991 | Holt | F16L 58/181 29/887 |
| 5,080,773 A | 1/1992 | Tatum, Jr. et al. | |
| 5,098,771 A | 3/1992 | Friend | |
| 5,139,634 A | 8/1992 | Carpenter et al. | |
| 5,167,710 A | 12/1992 | Leroux et al. | |
| 5,174,871 A | 12/1992 | Russell | |
| 5,207,530 A | 5/1993 | Brooks et al. | |
| 5,254,228 A | 10/1993 | Westhof et al. | |
| 5,294,396 A | 3/1994 | Dressel et al. | |
| 5,370,783 A | 12/1994 | Carlson et al. | |
| 5,413,689 A | 5/1995 | Nora et al. | |
| 5,447,564 A | 9/1995 | Xie et al. | |
| 5,476,612 A | 12/1995 | Wessling et al. | |
| 5,507,933 A | 4/1996 | Nora et al. | |
| 5,525,208 A | 6/1996 | Pritula et al. | |
| 5,547,311 A | 8/1996 | Kenda | |
| 5,550,176 A | 8/1996 | Lewis et al. | |
| 5,609,748 A | 3/1997 | Kotowski et al. | |
| 5,700,398 A | 12/1997 | Angelopoulos et al. | |
| 5,753,861 A * | 5/1998 | Hansen | H02G 15/013 174/93 |
| 5,908,584 A | 6/1999 | Bennett | |
| 5,976,419 A | 11/1999 | Hawkins et al. | |
| 6,022,469 A | 2/2000 | Page | |
| 6,121,543 A | 9/2000 | Hallmark | |
| 6,193,443 B1 | 2/2001 | Trudeau et al. | |
| 6,193,857 B1 | 2/2001 | Davison et al. | |
| 6,303,017 B1 | 10/2001 | Page et al. | |
| 6,821,336 B1 | 11/2004 | Ramme et al. | |
| 7,186,321 B2 | 3/2007 | Benham | |
| 7,405,247 B2 | 7/2008 | Sachdev et al. | |
| 7,422,789 B2 | 9/2008 | Avakian et al. | |
| 7,540,776 B2 | 6/2009 | Graeve et al. | |
| 7,578,910 B2 | 8/2009 | Sirola et al. | |
| 7,619,161 B2 | 11/2009 | Okabayashi et al. | |
| 7,745,528 B2 | 6/2010 | Prud'Homme et al. | |
| 7,794,626 B2 | 9/2010 | Horton | |
| 8,081,415 B2 | 12/2011 | Nolletti | |
| 9,252,503 B2 | 2/2016 | Nolletti | |
| 10,109,392 B2 | 10/2018 | Maunder et al. | |
| 10,280,580 B1 * | 5/2019 | Goff | C23C 2/38 |
| 10,433,371 B2 | 10/2019 | Miller | |
| 2002/0162484 A1 | 11/2002 | Ramme et al. | |
| 2004/0099982 A1 | 5/2004 | Sirola et al. | |
| 2005/0194576 A1 | 9/2005 | Sirola et al. | |
| 2007/0187854 A1 | 8/2007 | Sirola et al. | |
| 2008/0217041 A1 | 9/2008 | Kim | |
| 2009/0233470 A1 | 9/2009 | Kim | |
| 2010/0159148 A1 | 6/2010 | Hagens et al. | |
| 2013/0048917 A1 | 2/2013 | Virtanen et al. | |
| 2014/0251793 A1 | 9/2014 | Funahashi et al. | |
| 2015/0028247 A1 | 1/2015 | Peters | |
| 2015/0282471 A1 | 10/2015 | Lampman et al. | |
| 2016/0163419 A1 | 6/2016 | Sirola et al. | |

FOREIGN PATENT DOCUMENTS

| | | |
|---|---|---|
| JP | 05198321 A | 8/1993 |
| KR | 101089543 B1 | 12/2011 |
| WO | 9714196 A1 | 4/1997 |
| WO | 9732936 A1 | 9/1997 |

\* cited by examiner

ELECTRICALLY-CONDUCTIVE CORROSION-PROTECTIVE COVERING

CROSS REFERENCES TO RELATED APPLICATIONS

This application claims the benefit of and/or priority from U.S. Provisional Patent Application No. 62/568,015 filed on Oct. 4, 2017, and U.S. Provisional Patent Application No. 62/703,481 filed on Jul. 26, 2018, both of which are incorporated herein by reference in their entirety.

FIELD

This document relates to coverings for metallic components, such as utility poles or guy anchor rods or direct buried tower steel. More specifically, this document relates to electrically-conductive corrosion-protective coverings for metallic components, and related methods.

SUMMARY

The following summary is intended to introduce the reader to various aspects of the detailed description, but not to define or delimit any invention.

A covering for a metallic component is disclosed. According to some aspects, the covering includes a water-impermeable heat-shrink polymeric matrix, and a particulate carbonaceous material dispersed in the polymeric matrix.

In some examples, the particulate carbonaceous material includes or is a calcined petroleum coke, a conductive carbon black, fluid coke, single-wall carbon nanotubes, graphite, and/or a carbon fibre.

A corrosion-protected electrical assembly is disclosed. According to some aspects, the corrosion-protected electrical assembly includes a metallic component having an outer surface, and a water-impermeable, electrically-conductive, heat-shrink covering applied to at least a portion of the outer surface.

In some examples, the metallic component is a utility pole or a guy anchor rod or direct buried tower steel. The metallic component may have a buried portion, and the heat shrink covering may be applied to the buried portion.

In some examples, the covering includes a water-impermeable heat-shrink polymeric matrix, and a particulate carbonaceous material dispersed in the polymeric matrix.

A method for protecting a metallic component from corrosion is disclosed. According to some aspects, the method includes applying a heat-shrink covering to at least a portion of the metallic component. The heat shrink covering is water-impermeable and electrically-conductive. The method further includes applying heat to the heat-shrink covering to shrink the heat-shrink covering and tighten the heat-shrink covering around the metallic component.

In some examples, the method further includes burying the portion of the metallic component in the earth.

In some examples, the heat-shrink covering includes a water-impermeable heat-shrink polymeric matrix, and a particulate carbonaceous material dispersed in the polymeric matrix.

According to some aspects, a corrosion-protected electrical assembly includes a metallic component having a bottom portion and an outer surface, and a water-impermeable, electrically-conductive covering applied to the outer surface at the bottom portion. The metallic component is a utility pole or a guy anchor rod or direct buried tower steel.

In some examples, the covering includes a water-impermeable polymeric matrix, and a particulate carbonaceous material dispersed in the polymeric matrix. The water-impermeable polymeric matrix can include a thermoplastic polymer or a latex. The particulate carbonaceous material can include a calcined petroleum coke, a conductive carbon black, a calcined fluid coke, a carbon fibre, single wall carbon nanotubes, and/or graphite.

In some examples, the bottom portion of the metallic component is buried in the earth.

According to some aspects, a method for protecting a metallic component from corrosion includes applying a covering to an outer surface of the metallic component at the bottom portion of the metallic component. The metallic component is a utility pole or a guy anchor rod or direct buried tower steel. The covering is water-impermeable and electrically-conductive.

In some examples, prior to step a), the method includes at least partially burying the bottom portion of the metallic component in the earth. Step a) can include pouring a fluid into a gap around the bottom portion of the metallic component, and solidifying the fluid to form the covering.

In some examples, step a) is carried out by spraying or painting.

In some examples, prior to step a), the method includes forming the covering. Step a) can include inserting the metallic component into the covering.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
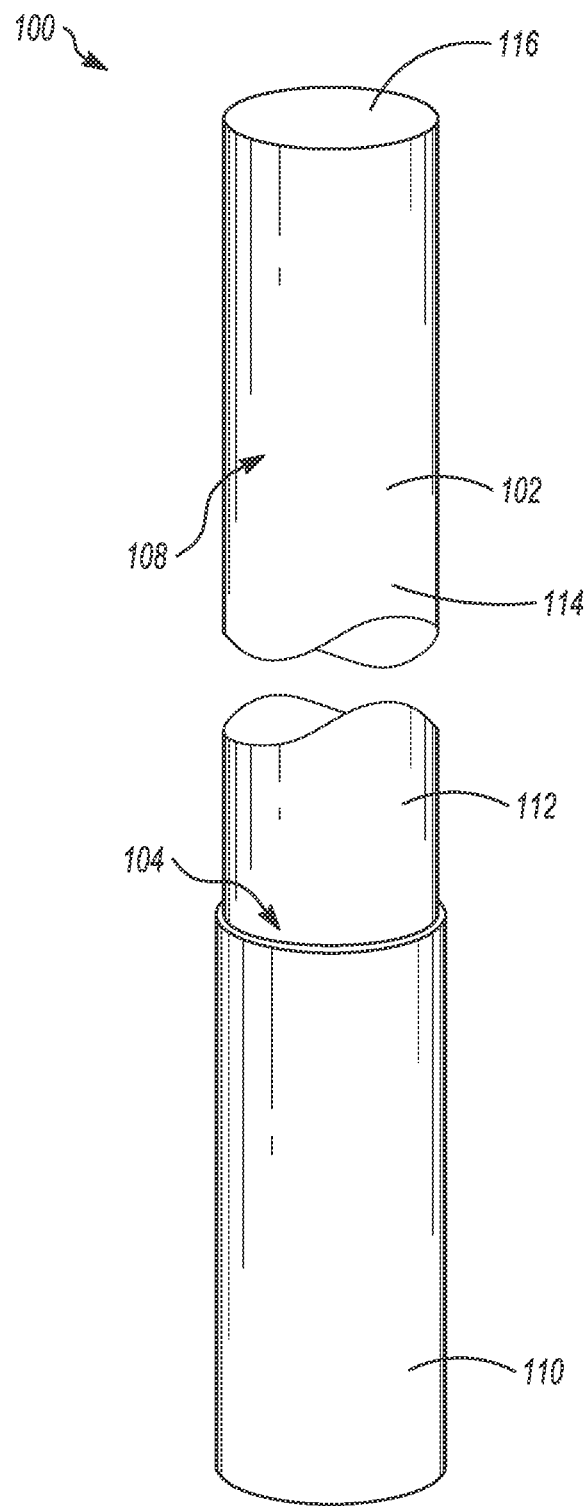
FIG. 1 is a perspective view of a utility pole having a water-impermeable, electrically-conductive, heat shrink covering applied to a portion of its outer surface.

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

In general, disclosed herein are coverings for metallic components, such as utility poles or guy anchor rods or direct buried tower steel. The coverings can be water-impermeable, and can thus protect the metallic components from corrosion (e.g. galvanic corrosion). The coverings can also be electrically-conductive, and can thus allow the metallic components to be electrically grounded. The coverings can in some examples be pre-applied to the metallic components. For example, the coverings can be heat-shrink coverings, which can be applied to the metallic components prior to installation of the metallic components. The heat-shrink nature of the coverings can facilitate application of the coverings to the metallic components. For further example, the coverings can be applied to the metallic components by spraying or painting. In other examples, the coverings can be applied to the metallic components in-situ. For example, the components of the covering may be provided as a fluid. The fluid may be poured into a form surrounding a buried end of a metallic component (e.g. a utility pole), and may then solidify (e.g. by curing or setting). The coverings may have a substantially long service life, and they may be resistant to scoring or scratching (e.g. so that covered metallic components can be transported from a factory to an installation site without substantive damage to the coverings).

In general, the coverings disclosed herein can include a water impermeable polymeric matrix and one or more non-metallic conductive materials dispersed in the polymeric matrix. The non-metallic conductive materials may be dispersed in any suitable polymeric matrix. The covering can be applied with various application techniques.

As used herein, the term 'heat-shrink' can refer to a material that will shrink upon the application of heat, or to a material that has already been shrunk by the application of heat. That is, the term 'heat-shrink covering' can refer to a covering both before and after being shrunk by the application of heat. The term 'heat-shrinkable' is used herein to specifically refer to a material that will shrink upon the application of heat—i.e. the term 'heat-shrinkable covering' refers to a covering before being shrunk by the application of heat. The term 'heat-shrunk' is used herein to specifically refer to a material that has already been shrunk by the application of heat—i.e. the term 'heat-shrunk covering' refers to a covering after being shrunk.

As used herein, the term 'electrically-conductive' indicates that the covering has an electrical resistivity of less than 500 ohm·cm. For example, the covering may have an electrical resistivity of between 0.1 ohm·cm and 500 ohm·cm.

As used herein, the term 'water-impermeable' indicates that the covering has a water permeability of less than or equal to 1.0 US Perms, or a water permeability of less than $10^{-5}$ cm/s. For example, in the case of a covering including a heat-shrink polymeric matrix, the covering may have a water permeability of between 0.01 US Perms and 1.0 US Perms. Alternatively, in the case of a covering that is formed in-situ, for example by pouring, the covering may have a water permeability of between $10^{-5}$ cm/s and $10^{-10}$ cm/s.

As used herein, the term 'in situ' indicates that the metallic component has already been installed, either partially or fully, at its site of use. For example, the statement that the coverings can be applied to a utility pole in-situ indicates that the coverings can be applied to a bottom end of the utility pole after the bottom end of the utility pole is partially or fully buried in the earth. In contrast, the term 'pre-applied' indicates that the covering is applied to the metallic component prior to installation of the metallic component, for example at a manufacturing facility.

The metallic components covered by the coverings can be various electrical conductors, for example utility poles (e.g. steel utility poles), or guy anchor rods (e.g. for utility poles), or direct buried tower steel (e.g. a monopole or the legs of a tower).

The metallic components can be fully covered by the coverings, or partially covered by the coverings. For example, if a specific portion of the outer surface of the metallic component is in a corrosive environment (e.g. buried in the earth), the covering may be applied to that portion.

As will be described in further detail below, the covering may include a matrix that is formed from a polymer (also referred to herein as a 'polymeric matrix'), and a particulate carbonaceous material dispersed in the matrix. The covering may optionally include various additives. The polymeric matrix may provide the covering with sufficient water impermeability to protect a metallic component from corrosion (e.g. to protect a buried end of a utility pole from galvanic corrosion), and the particulate carbonaceous material may provide the covering with sufficient electrical conductivity to, for example, allow the metallic component to be electrically grounded.

Figure 2:
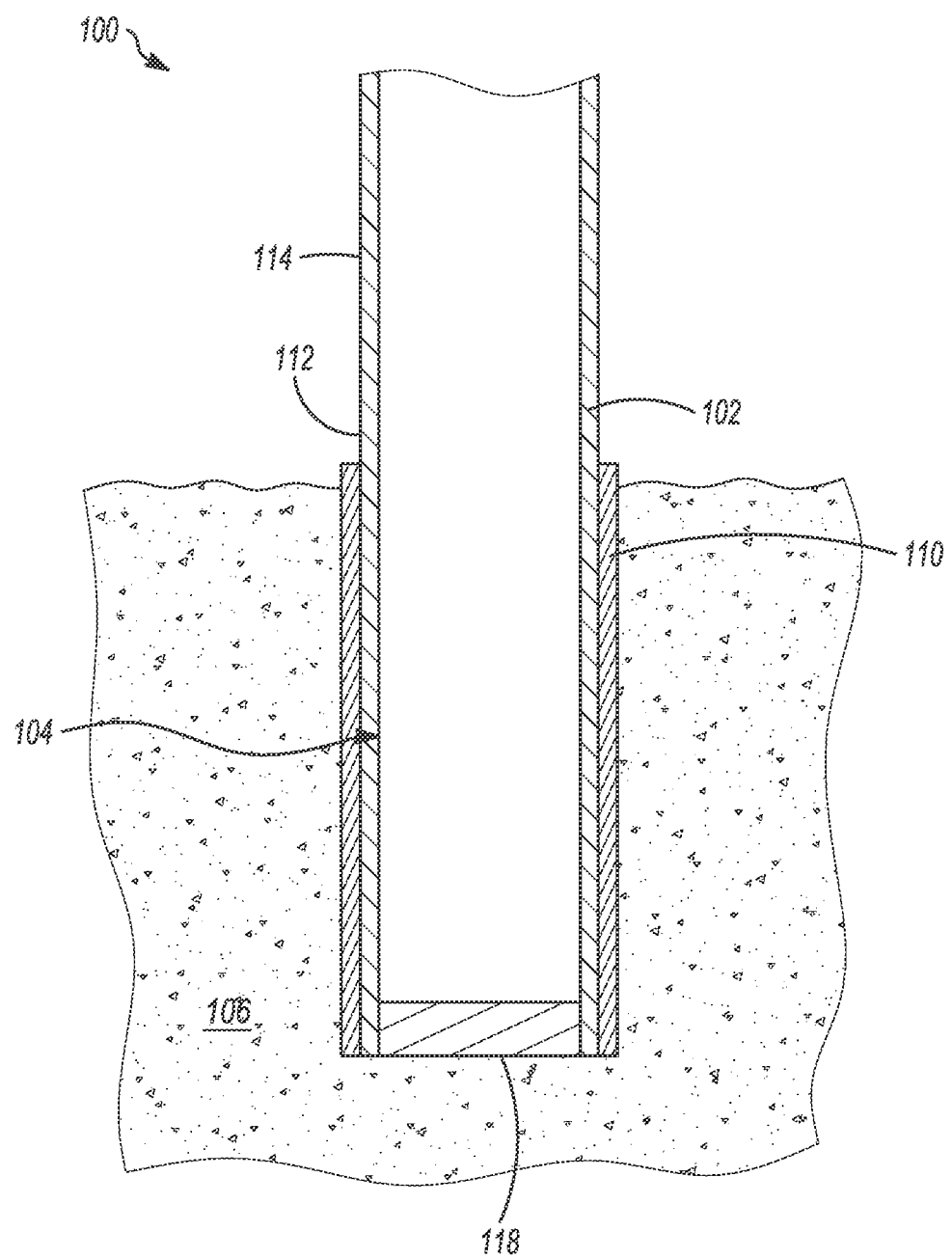
FIG. 2 is a partial cross-sectional view of the metallic component and covering of FIG. 1 when buried in the earth.

Referring now to FIG. 1, a first example of a pre-applied covering is shown, in which the polymeric matrix of the covering is formed from a heat-shrink polymer. Specifically, an example corrosion-protected electrical assembly 100 is shown. The assembly 100 includes a metallic component, which in this case is a steel utility pole 102. The utility pole 102 has a bottom portion 104, which in FIG. 2 is shown buried in the earth 106. The utility pole 102 also has an opposed top portion 108 that is above the earth 106. The utility pole also has an outer surface 112, which includes a circumferential outer surface 114, and opposed top and bottom end surfaces, 116 and 118 respectively. For simplicity, the various structures that may be attached to the utility pole 102 are not shown.

Referring still to FIGS. 1 and 2, the assembly 100 further includes a covering 110 applied to outer surface 112 of the utility pole, particularly the outer surface 112 at the bottom portion 104 of the utility pole 102. In the examples shown, the covering 110 covers a portion of the circumferential outer surface 114. In alternative examples, the covering may also cover the bottom end surface 118.

In the example shown, the covering 110 is a water-impermeable, electrically-conductive, heat-shrink covering. As discussed above, the water-impermeability of the covering 110 can protect the bottom portion 104 of the utility pole 102 from corrosion, particularly galvanic corrosion, while the electrical conductivity of the covering 110 can allow for the utility pole 102 to be electrically grounded (i.e. in electrical contact with the surrounding earth).

In the examples of FIGS. 1 and 2, heat has been applied to the covering 110 to shrink the covering 110, so that it fits tightly around the bottom portion 104 of the utility pole 102.

The covering 110 may be formed from a water-impermeable, heat-shrink, polymeric matrix. A particulate carbonaceous material may be dispersed in the polymeric matrix, in order to render the covering 110 electrically-conductive.

In some examples, the polymeric matrix of the covering 110 may be or may include a polyolefin such as polyethylene or polypropylene; a fluoropolymer such as polyvinylidene fluoride; an ethylene vinyl acetate; a silicone-grafted cross-linked polyethylene; a latex such as a styrene butadiene latex, an acrylic latex, a styrene acrylic latex, an acrylonitrile-butadiene latex, or a vinyl acetate copolymer latex; a flexible polyvinylchloride compound; a polychloroprene; a silicone elastomer; a fluoroelastomer and/or other elastomeric materials; or a combination thereof.

In some examples, the particulate carbonaceous material of the covering 110 may include or may be a coke, and/or graphite, and/or carbon black, and/or single wall carbon nanotubes, and/or carbon fibre. The coke may be or may include a calcined fluid coke, and/or calcined petroleum coke, and/or metallurgical coke. The calcined fluid coke may be one sold by Asbury Carbons (Asbury, N.J.) under the name 251 P Calcined Fluid Coke (20×200 mesh).

In some examples, the particulate carbonaceous material may make up between 0.1 wt % and 70% of the covering, or between 0.1 wt % and 50 wt % of the covering. The remainder of the covering may be made up of the polymeric matrix, and/or additives.

In some examples, the covering may be fabricated by compounding the polymeric matrix, the particulate carbonaceous material, and any additives, then processing this material similarly to other heat-shrink materials. For example, this material may be extruded as a tube, and the tube be fully or partially cross-linked, for example by silane condensation, applying radiation, or chemically via radical polymerization. The tube may then be heated to above the polymer's crystalline melting point and expanded in diameter, for example in a vacuum chamber. The tube may then be cooled, to yield an electrically-conductive corrosion-protective heat-shrinkable covering in the form of a tube (also referred to herein as a 'tubular heat-shrinkable covering').

In alternative examples, the material may be extruded or formed as a sheet, rather than a tube. Coverings in the form of a sheet may be referred to herein as 'heat-shrinkable sheet coverings'.

In some examples, the heat-shrink coverings may be lined with an electrically-conductive adhesive.

Optionally, the heat-shrink coverings may be in the form of a co-extruded system, which includes an additional layer of a hot-melt adhesive, such as suitable ethyl-vinyl acetate (EVA), or other polymeric materials such as butyl-elastomers containing similar carbonaceous materials. The carbonaceous materials can allow for continuous conductivity throughout the polymeric matrix.

The covering may be applied to the metallic component in a variety of ways. In some examples, the metallic component (e.g. the bottom portion of a utility pole) may be inserted into the tubular heat-shrinkable covering, and then heat may be applied to shrink the tubular heat-shrinkable covering and tighten the tubular heat-shrinkable covering around the metallic component. In other examples, the metallic component may be wrapped with the heat-shrinkable sheet coverings, and then heat may be applied to shrink the heat-shrinkable sheet covering and tighten the heat-shrinkable sheet covering around the metallic component. In some examples, an electrically-conductive adhesive may be applied between the covering and the metallic component. In some examples, machinery similar to that used for coating pipes with heat-shrink coatings may be used to apply the covering to the metallic component. The covered portion of the metallic component (e.g. the bottom portion of the utility pole) may optionally then be buried in the earth.

Figure 3:
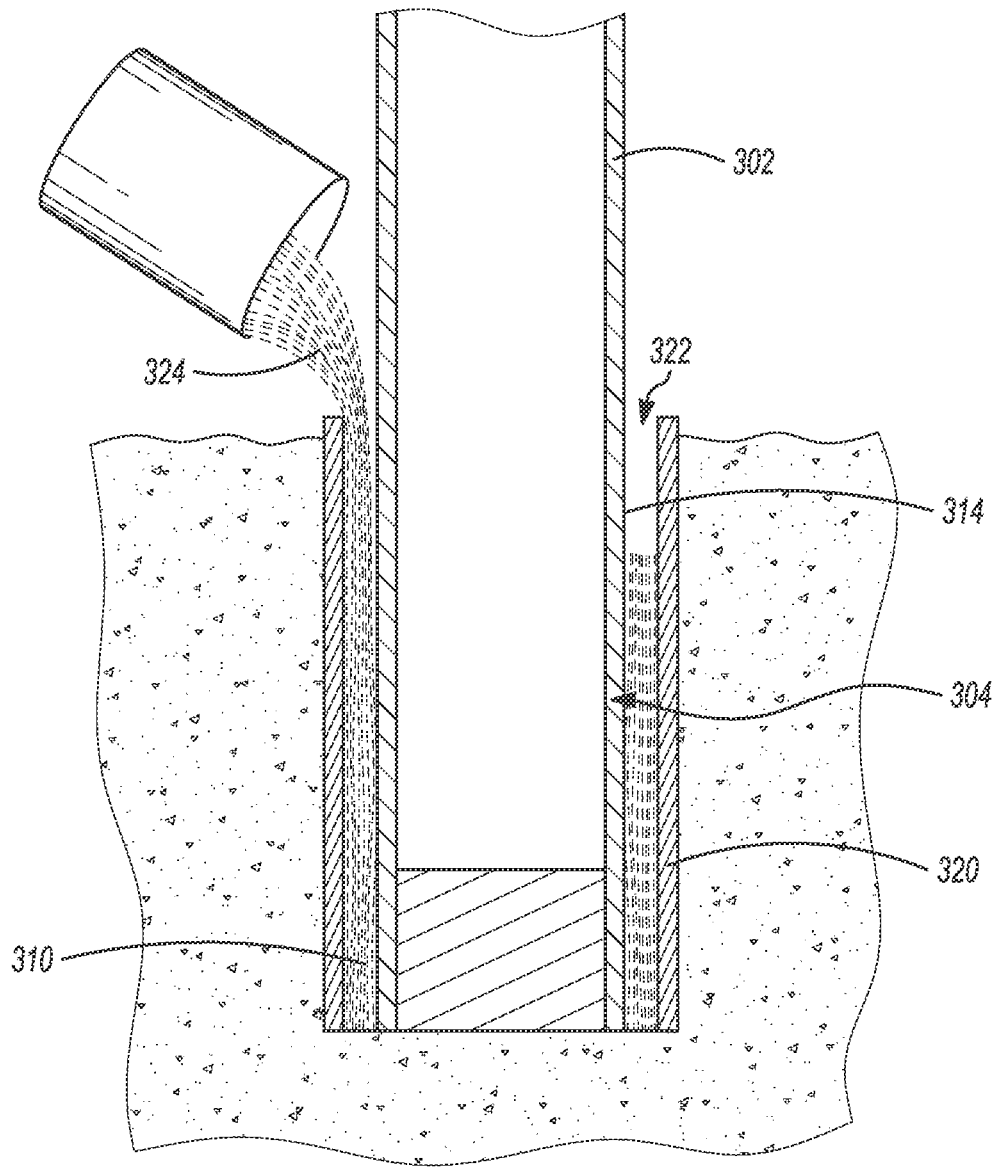
FIG. 3 is a schematic view showing another example of a covering and utility pole, where the utility pole is shown in partial cross-section, buried in the earth, and the material for the covering is being poured into a gap around the utility pole.

Referring to FIG. 3, another example method of forming a covering is shown. In this example, like features as in FIGS. 1 and 2 are referred to with like reference numerals, incremented by 200.

In the example of FIG. 3, the covering 310 is formed in-situ. Specifically, in the example shown, the bottom portion 304 of the steel utility pole 302 is buried in the earth, with a form 320 surrounding the bottom portion 304. The form 320 can be, for example, a tube made from a biodegradable material such as cardboard, or a tube made from a particulate carbonaceous material dispersed in a binder. The form 320 is sized so that there is a gap 322 between the circumferential outer surface 314 of the steel utility pole 302 and the inner surface of the form 320. The material for the covering 324, in a fluid state, can then be poured into the gap 322, and can be cured or allowed to set to form the covering 310.

In the example shown in FIG. 3, the material does not cover the bottom surface of the utility pole 302. In alternative examples, the material may cover the bottom surface of the utility pole 302. For example, some of the material for the covering 324 can be poured into the hole before the steel utility pole 302 is in place.

In this example, the covering 310 can be made from a polymeric matrix that is provided as a fluid and solidifies (e.g. sets or cures) to form a water-impermeable solid. For example, the fluid polymeric matrix may be made from a latex such as a styrene butadiene latex, an acrylic latex, a styrene acrylic latex, a acrylonitrile-butadiene latex, a vinyl acetate copolymer latex, or a combination thereof. The covering 310 can further include a curing agent for the fluid polymeric matrix. The curing agent can be a cement, such as a Portland cement.

The particulate carbonaceous material of the covering 310 may be or may include a coke, and/or graphite, and/or carbon black, and/or carbon fibre, and/or carbon nanotubes. The coke may be or may include a calcined fluid coke, and/or calcined petroleum coke, and/or metallurgical coke. The calcined fluid coke may be one sold by Asbury Carbons (Asbury, N.J.) under the name 251P Calcined Fluid Coke (20×200 mesh).

In some examples, the particulate carbonaceous material may make up between 40 wt % and 90 wt % of the covering 310, or between 50 wt % and 90 wt % of the covering 310. The remainder of the covering 310 may be made up of the polymeric matrix, and/or additives (e.g. the curing agent, and/or a surfactant, and/or water, and/or propylene glycol).

The material for the covering 310, including the polymeric matrix in a fluid state, the curing agent, the water, the particulate carbonaceous material, and any other additives can be combined, and then poured into the gap 322, and then cured or allowed to set.

In an alternative example, the polymeric matrix may be made from a thermoplastic material such as polypropylene, which is heated to form a fluid, and then poured into the gap 322. Upon cooling, the thermoplastic material can set to form a solid. The thermoplastic material can optionally be cross-linked. A particulate carbonaceous material may be dispersed in the polymeric matrix when it is in its fluid state, in order to render the covering 310 electrically-conductive.

In other examples (not shown), the covering may be pre-applied and formed directly onto the metallic component by other methods, such as spraying or painting. In yet other examples, the covering may be preformed and then pre-applied to the metallic component. For example, the covering may be formed as a tube, with an interior diameter sized to snugly fit around a utility pole. Heat may be applied to the tube to soften the tube, and then the utility pole may be inserted into the tube. The tube may then cool and harden.

EXAMPLES

A material of the following composition was prepared:

TABLE 1

Composition of in-situ covering 1

| Component | Weight % |
|---|---|
| Particulate carbonaceous material: CC60 Calcined Petroleum Coke (Oxbow Calcining LLC) | 66.05 |
| Polymeric matrix: BarrierPro ® 4550 Latex (Styrene-Butadiene Emulsion) | 22 |
| Polymerization Surfactant (Chemtex 2504) | 0.22 |
| Curing Agent: Portland Cement (Contempra Type GUL Portland Limestone Cement, St. Mary's Cement) | 4.02 |
| Tap Water | 3.70 |
| Propylene Glycol, Pro-17 | 4.00 |

A material of the following composition was prepared:

TABLE 2

Composition of in-situ covering 2

| Component | Weight % |
|---|---|
| Particulate carbonaceous material: CC60 Calcined Petroleum Coke (Oxbow Calcining LLC) | 33.03 |
| Particulate carbonaceous material: 251P Calcined Fluid Coke (Asbury Carbons) | 33.03 |
| Polymeric matrix: BarrierPro ® 4550 Latex (Styrene-Butadiene Emulsion) | 22 |
| Polymerization Surfactant (Chemtex 2504) | 0.22 |
| Curing Agent: Portland Cement (Contempra Type GUL Portland Limestone Cement, St. Mary's Cement) | 4.02 |
| Tap Water | 6.70 |
| Propylene Glycol, Pro-17 | 1.00 |

The Latex, polymerization surfactant, propylene glycol, and water were mixed, and the particulate carbonaceous material was slowly added to the mixture with ongoing mixing. This mixture was then stored in a sealed container.

When ready for use, the container was opened and the curing agent was added with additional mixing. The material was then allowed to cure. Samples of the cured material were tested for their material properties. Results are shown in tables 3 and 4:

TABLE 3

Properties of cured in-situ covering 1

| Property | Value |
|---|---|
| Electrical Resistivity | 18 ohm · cm |
| Freeze-Thaw Resistance | 30 years |
| Environmental Impact | Neutral |

TABLE 4

Properties of cured in-situ covering 2

| Property | Value |
|---|---|
| Electrical Resistivity | 12 ohm · cm |
| Freeze-Thaw Resistance | >13 years (testing ongoing) |
| Environmental Impact | Neutral |

A heat shrinkable material of the following composition was prepared using radiation curing.

TABLE 5

Composition of heat-shrinkable covering 1

| Component | Weight % |
|---|---|
| Particulate carbonaceous material: Petroleum coke (Century Aluminum) | 30.00 |
| Particulate carbonaceous material: AGM94CF0125 Chopped Carbon Fiber (Asbury Carbons) | 10.00 |
| Polymeric matrix: EVA Co-Polymer with % VA ≥25%; Braskem Evateno HM 728 or Elvax 360 | 55.50 |
| Optional Dispersion Aid: Ox. PE Wax; Licolub H12 | 1.00 |
| Cross-linking Co-Agent: TMPTMA or TAIC | 2.50 |
| Antioxidant Mixture | 1.00 |

The polymeric blend was mixed in a twin-screw extruder and was extruded. Extrusions in sheet form and tube form were conducted. Following extrusion, the conductive polymeric material was radiation cured using Electron Beam technology to achieve a cross-link density of 60% or more and expanded depending on form. Upon application of heat, the polymeric shape recovered to its original dimensions and formed a barrier with interfacial contact to the metal substrate with resistivity values of 0.1-50 ohm·cm.

TABLE 6

Properties of heat-shrinkable covering 1

| Property | Value |
|---|---|
| Resistivity | 36 Ω · cm |
| Environmental Impact | Neutral |

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A method for protecting a metallic component from corrosion, wherein the metallic component is a utility pole or a guy anchor rod or direct buried tower steel, the method comprising:
    a) at least partially burying a bottom portion of the metallic component in the earth; and
    b) after step a), applying a covering to an outer surface of the metallic component at the bottom portion of the metallic component, the covering being water-impermeable and electrically-conductive,
        wherein step b) comprises pouring a fluid into a gap around the bottom portion of the metallic component, and solidifying the fluid to form the covering.

2. A method for protecting a metallic component from corrosion, wherein the metallic component is a utility pole or a guy anchor rod or direct buried tower steel, the method comprising:

a) applying a covering to an outer surface of the metallic component at a bottom portion of the metallic component, the covering being water-impermeable and electrically-conductive,
   wherein step a) is carried out by spraying or painting.

3. A method for protecting a metallic component from corrosion, wherein the metallic component is a utility pole or a guy anchor rod or direct buried tower steel, the method comprising:
   a) forming a covering, the covering being water-impermeable and electrically-conductive; and
   b) after step a), applying the covering to an outer surface of the metallic component at a bottom portion of the metallic component by inserting the metallic component into the covering.

* * * * *